United States Patent [19]

Wasik et al.

[11] 4,214,369

[45] Jul. 29, 1980

[54] PASTA MEASURER

[76] Inventors: Ronald J. Wasik; Janice E. Wasik, both of 1293 Limberlost Rd., London, Ontario, Canada, N6G 3M3

[21] Appl. No.: 959,713

[22] Filed: Nov. 13, 1978

[51] Int. Cl.² ............................................. G01B 3/02
[52] U.S. Cl. .................................. 33/137 R; 33/174 T
[58] Field of Search ................ 33/137 R, 179, 178 R, 33/2 R, 175, 177, 11, 10, 17

[56] References Cited

U.S. PATENT DOCUMENTS

| | | | |
|---|---|---|---|
| 458,564 | 9/1891 | Engel | 33/179 |
| 789,352 | 5/1905 | Badger | 33/137 R |
| 1,011,628 | 12/1911 | Klein | 33/129 X |
| 2,262,664 | 11/1941 | Bresson | 33/137 R X |
| 3,874,085 | 4/1975 | Atkins | 33/174 T |
| 4,120,094 | 10/1978 | Pfaelzer | 33/174 T |

OTHER PUBLICATIONS

American Machinist, 8/7/1950, p. 11e, "Pipe Tape Shows Nominal Sizes".

Primary Examiner—Harry N. Haroian

[57] ABSTRACT

A device for measuring the quantity of raw pasta required to produce the desired amount of cooked pasta. In the domestic market most packaged spaghetti is ten inches in length and a simple measurer for calculating the required amount of this raw product selected for cooking is a non-stretchable, flexible measuring line that can be looped around a bundle of spaghetti to determine its circumference. The line is calibrated and can show the number of serving portions of cooked spaghetti that the encircled bundle will produce. To facilitate its use in the family kitchen the line is provided with a ring on one end thereof that can be slipped over the thumb of the user and holding a bundle of spaghetti, of approximately correct size, in her hand the line is wrapped around the spaghetti to measure its circumference and determine if more or less spaghetti is needed. To improve the accuracy of the measuring line it is desirable that the calibrations start at a point spaced from the ring and extend therefrom toward the free end of the line. The reference point at which the calibrations begin may be in the nature of an external projection with which the looped line encircling the bundle has sliding engagement and at which point the bundle's circumferential measurement is read. A tab on the free end of this line provides a convenient finger grip and its flattened faces may bear useful information, e.g. volume of cooked products that will result from the encircled bundle of raw pasta, cooking time, etc.

3 Claims, 4 Drawing Figures

PASTA MEASURER

BACKGROUND OF THE INVENTION

This invention relates to a measuring device appertaining more particularly to a raw pasta measurer for selecting the quantity of raw pasta (e.g. spaghetti, vermicilli, etc.) required to produce the desired amount of the cooked product.

Measuring devices of a wide variety are known that provide a flexible member calibrated for some particular purpose such as measuring fabrics, the length of portions of knitted articles, lumber, land, etc., see Canadian Pat. Nos. 7,318; 185,952; 332,692 and 358,400 also U.S. Pat. No. 3,469,587 but none suitable for accurately measuring a handful of dry spaghetti-type pasta of a given length to determine the quantity to be cooked to provide the desired amount of the end cooked product.

With the growing recognition of using pasta, as a reliable food for improving nutrition, interest has increased in the proper cooking of the product. Some domestic manufacturers recommend that spaghetti be cooked in salted water eight times the weight of the spaghetti. From a scientific standpoint this is an inadequate amount of water (Borasio 1935; Larmand & Voisey 1975)—a minimum ratio of 10:1 should be used. Furthermore the addition of salt is a mistake as it lengthens the cooking time by 10-20 percent and increases the pasta stickiness (Birmington, et. al. 1939; Wasik, et. al. 1978). So both these recommendations of the manufacturers are undesirable.

When it comes to properly cooking pasta the consumer is at a real disadvantage, being without both the essential equipment and the knowledge and lacking even simple quantity measuring procedure with the result that some considerable food wastage results.

OBJECTS OF THE INVENTION

Accordingly it is an object of this invention to provide a device for accurately measuring the required quantity of raw pasta required to produce the desired amount of the cooked product.

Another object is to provide a raw pasta measurer that enables the rapid and reliable selection of the required quantity of the dry uncooked pasta having a flexible line for measuring the circumference of a handheld bundle of raw pasta and a scale of indicia translating the measured circumference and the known length thereof to the resultant amount of the cooked product.

Another object is to provide a pasta measurer suitable for home use being small, compact, simple to use and of low cost.

BRIEF DESCRIPTION OF THE DRAWINGS

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

In the drawings.

DETAILED DESCRIPTION OF THE INVENTION

Figure 1:
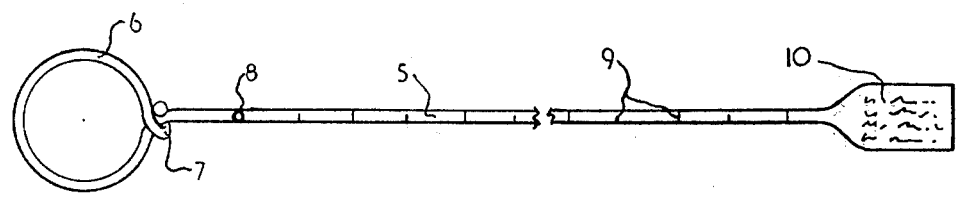
FIG. 1 is a plan view of a preferred form of the device.
Figure 2:
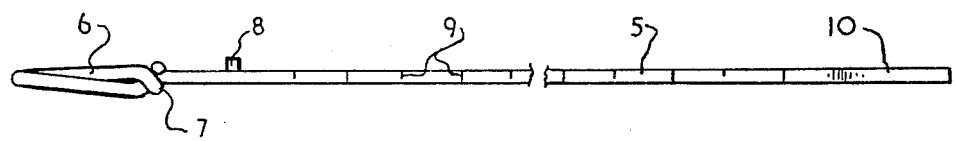
FIG. 2 is a side elevation thereof.
Figure 3:
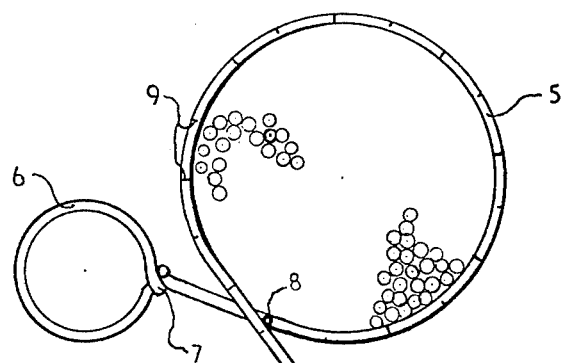
FIG. 3 is a plan view showing the measuring line looped around a bundle of spaghetti.
Figure 4:
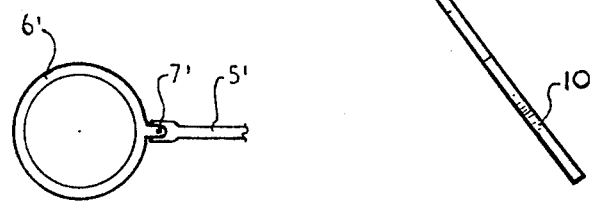
FIG. 4 is a detail plan view of a rotatable connection between the ring and line.

Generally domestic pasta, such as spaghetti and vermicilli, is marketed in standard 10 and 12 inch lengths and to accurately measure the quantity of a handful or hand-held bundle of such raw or uncooked pasta, the measurer includes a measuring line 5 that is flexible and unstretchable and of a suitable length of approximately ten inches. On one end of the line there is a ring 6 that fits on the thumb or finger of the user to provide a convenient support for the device. As seen in FIGS. 1, 2 and 3 this ring may be adjustable allowing it to expand or tighten as the line slides through the annular end bite 7 which may be rigidified or strengthened if found necessary. As seen in modified form in FIG. 4 the ring 6' is of fixed diameter and connects with the line 5' by a swivel or pivot pin 7' which in some circumstances may afford greater freedom to the line.

On the line 5 at a distance spaced from the ring 6 there is a reference point 8, that is here shown as an external projection, and beginning at this reference point and extending in a direction away from the ring, that is toward the free end of the line, the line 5 has graduation marks 9 thereon.

The free end of measuring line 5, that is the end of the line remote from the ring 6, has a finger grip tab 10 with flat surfaces bearing indicia translating measurements taken on the line in terms of the amount (e.g. the number of serving portions) of cooked pasta such measured quantity of raw pasta will produce.

The device is used to measure the circumference of a handful or hand-held bundle of raw pasta of known length and to translate such quantity measurements into the number of serving portions of cooked pasta. The ring 6 is slipped on the thumb or finger of the hand holding the bundle of pasta. The graduated line 5 is wrapped around the pasta bundle in an encircling loop, as shown in FIG. 3, and pulled taut as it slides against the reference point projection 8, at which point the graduate mark on the line indicates the bundle's circumference. By referring to the indicia on tab 10 the user knows exactly how much cooked pasta will result from the hand-held bundle.

The accuracy of this device was tested on six commercial types of spaghetti shown from earlier work (Voisey, et. al. 1977) to have a broad spectrum of pasta quality. All samples were of standard 10 inch length. The samples were cooked to a time corresponding to the disappearance of the ungelatinized starch core (Larmand and Voisey, 1975). Upon being cooked completely the spaghetti was blanched for one minute in cold tap water and transferred to a "pyrex" measuring cup. The volume of cooked spaghetti was read after five minutes. The results were reported in cups.

| | ACCURACY TESTS | | |
|---|---|---|---|
| Brand | Trial Number | Device Setting | Volume of Cooked Pasta |
| PRIMO | 1 | 1½ | 1½ |
| | 2 | | 1½ |
| | 3 | | 1½ + |
| GATTUSO | 1 | 1½ | 1½ + |
| | 2 | | 1½ |
| LIDO | 1 | 1½ | 1½ |
| | 2 | | 1½ |

ACCURACY TESTS -continued

| Brand | Trial Number | Device Setting | Volume of Cooked Pasta |
|---|---|---|---|
| LANCIA | 1 | 1½ | 1½ + |
|  | 2 |  | 1½ + |
| CATELLI | 1 | 1½ | 1½ |
|  | 2 |  | 1½ |
| CATELLI Spaghettini | 1 | 1½ | 1½ |
|  | 2 |  | 1½ |

Notes:
All spaghetti samples were of a diameter in the range of 1.6 –1.8 mm. Spaghettini samples were of a diameter of less than 1 mm. Volumes marked + were slightly greater than 1½ cups.

From the above table it can be concluded that the present device can predict with reasonable accuracy the volume of cooked spaghetti that will be obtained from a given circumference of uncooked pasta, assuming the volume has been calibrated for the particular length of spaghetti used.

The finger grip tab 10 may be changed to one calibrated to spaghetti of a different length—for added safety the length of line 5 may correspond with the length of spaghetti being used. Additionally, if space permits, the tab may have cooking instructions or the like inscribed thereon.

Heretofore, the only solution to judging the quantity of uncooked pasta to be cooked has been to weigh the raw material which has placed the average consumer at a disadvantage as kitchen scales are not designed for that purpose. If suitable scales were available, the weighing procedure would be clumsy and time consuming.

From the foregoing description, taken in conjunction with the accompanying drawings, it will be apparent that a pasta measurer is provided that will fulfill all the necessary requirements of such a device but as various changes can be made in the size, shape, material and arrangement of parts within the scope of the appended claims, it is intended that all matters contained herein shall be interpreted in an illustrative and not in a limitive or restrictive sense.

We claim as our invention:

1. A measuring device for accurately measuring the amount of uncooked spaghetti or vermicelli required to produce a given volume of cooked pasta comprising:
   a flexible calibrated measuring line,
   a ring on one end thereof,
   a reference point for said calibrations on said line spaced from said ring said reference point is an external projection against which the looped free end portion of the line has sliding engagement, and
   means for relating the said calibrations to volume of cooked pasta wherein said means comprises a finger grip tab at the free end of said line, said tab containing indicia for relating said calibrations to said volume of cooked pasta.

2. The device of claim 1 wherein the said line is of a length equal to the length of pasta to which said calibrations apply.

3. The device of claim 1 wherein the said indicia relates the calibrations to cooked volume for different lengths of pasta.

* * * * *